(12) United States Patent
Moreau-Gobard et al.

(10) Patent No.: US 7,574,247 B2
(45) Date of Patent: Aug. 11, 2009

(54) AUTOMATIC CORONARY ISOLATION USING A N-MIP RAY CASTING TECHNIQUE

(75) Inventors: Romain Moreau-Gobard, Princeton, NJ (US); Charles Florin, Lawrenceville, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 634 days.

(21) Appl. No.: 10/983,921

(22) Filed: Nov. 8, 2004

(65) Prior Publication Data

US 2005/0105786 A1   May 19, 2005

Related U.S. Application Data

(60) Provisional application No. 60/520,789, filed on Nov. 17, 2003.

(51) Int. Cl.
  *A61B 5/05*   (2006.01)
  *G06K 9/00*   (2006.01)
(52) U.S. Cl. ............ 600/407; 382/128; 600/416
(58) Field of Classification Search ......... 600/425, 600/416
  See application file for complete search history.

(56) References Cited

U.S. PATENT DOCUMENTS

| | | | |
|---|---|---|---|
| 5,360,006 A * | 11/1994 | Geiser et al. | 600/425 |
| 5,435,310 A * | 7/1995 | Sheehan et al. | 600/416 |
| 5,601,084 A * | 2/1997 | Sheehan et al. | 600/450 |
| 6,295,464 B1 * | 9/2001 | Metaxas | 600/407 |
| 6,377,835 B1 * | 4/2002 | Schoenberg et al. | 600/419 |
| 6,535,623 B1 * | 3/2003 | Tannenbaum et al. | 382/128 |
| 6,628,743 B1 * | 9/2003 | Drummond et al. | 378/8 |
| 6,816,607 B2 * | 11/2004 | O'Donnell et al. | 382/131 |
| 6,873,718 B2 * | 3/2005 | O'Donnell et al. | 382/131 |
| 6,879,711 B2 * | 4/2005 | Maurincomme et al. | 382/128 |
| 7,260,252 B2 * | 8/2007 | Fujisawa | 382/131 |
| 2004/0059237 A1 * | 3/2004 | Narayan et al. | 600/509 |
| 2004/0066961 A1 * | 4/2004 | Spreeuwers et al. | 382/128 |
| 2004/0082846 A1 * | 4/2004 | Johnson et al. | 600/410 |
| 2005/0110791 A1 * | 5/2005 | Krishnamoorthy et al. | 345/419 |
| 2005/0163357 A1 * | 7/2005 | Makram-Ebeid et al. | 382/128 |
| 2006/0251307 A1 * | 11/2006 | Florin et al. | 382/128 |

OTHER PUBLICATIONS

Raghav Raman, Sandy Napel, and Geoffrey D. Rubin, Technical Developments: Curved-Slab Maximum Intensity Projection: Method and Evaluation, Feb. 10, 2003, pp. 255-260, vol. 229, RSNA.

\* cited by examiner

*Primary Examiner*—Eric F Winakur
*Assistant Examiner*—Helene Bor

(57) ABSTRACT

A novel method is presented for detecting coronary arteries as well as other peripheral vessels of the heart. After finding the location of the myocardium through a segmentation method, such as a graph theoretic segmentation method, the method models the heart with a biaxial ellipsoid. For each point of the ellipsoid, a collection of intensities are computed that are normal to the surface. This collection is then filtered to detect the cardiovascular structures. Ultimately, vessel centerline points are detected using a vessel tracking method, and linked together to form a complete coronary artery tree.

20 Claims, 6 Drawing Sheets

AUTOMATIC CORONARY ISOLATION USING A N-MIP RAY CASTING TECHNIQUE

CROSS-REFERENCE TO RELATED APPLICATIONS

This application claims priority to U.S. Provisional Application No. 60/520,789, which was filed on Nov. 17, 2003, and which is fully incorporated herein by reference.

BACKGROUND OF THE INVENTION

1. Field of the Invention

The present invention relates generally to the field of medical imaging, and, more particularly, to automatic coronary isolation using a n-MIP ray casting technique.

2. Description of the Related Art

Heart disease is a leading cause of death in the United States. One type of heart disease is coronary artery disease. Coronary artery disease is a narrowing or blockage of coronary arteries, which are the arteries that provide the heart with blood. This narrowing or blockage potentially slows blood flow, which decreases the oxygen and nutrients going to the heart. This may lead to chest pain (i.e., angina), or, if one or more of the coronary arteries are completely blocked, a heart attack. Other problems resulting from coronary pathologies include congestive heard failure (hereinafter "CHF").

Coronary arteries become narrowed or clogged by plaque build-up in the artery walls. Plaque may include excessive cholesterol and other substances in the bloodstream, such as inflammatory cells, proteins and calcium. Plaque build-up in the arteries is called atherosclerosis, which is also known as "hardening of the arteries."

The early detection of plaque, aneurysms and abnormal configuration of coronary arteries is an important factor in the diagnosis and treatment of coronary pathologies. Echocardiography is a leading tool for the detection of plaque, aneurysms and abnormal configuration of coronary arteries. An echocardiogram uses high-frequency sound waves to visualize the anatomy, structure, and function of the heart. Echocardiography disadvantages include low resolution and noise. Generally, it is not possible to visualize coronary arteries in echocardiography.

More recently, computer tomography ("CT") has increased in popularity in a wide variety of medical diagnosis fields, such as the detection of cancer. CT provides sub-millimetric spatial resolution and low noise level. However, a very limited number of techniques exist for the detection of heart peripheral vessels in CT.

Magnetic Resonance ("MR") provides the same resolution and low noise level provided by CT, and, additionally, is totally non-invasive. One using MR does not need any contrast agent injection as required by CT. Furthermore, CT uses X-rays, which are potential health risks over long time exposure, while MR uses the body's magnetic field. However, users of pacemakers, aneurysm clips, and other implants cannot use MR.

SUMMARY OF THE INVENTION

In one aspect of the present invention, a method of automatically retrieving centerlines of peripheral vessels of a heart in an image is provided. The method includes segmenting the heart in the image to produce a three-dimensional ("3D") segmented myocardium; computing a 3D distance map from the three-dimensional segmented myocardium; casting normal maximum intensity projection rays for each voxel on the surface of the heart in the 3D distance map; filtering the rays to obtain vessel candidate points; and refining the vessel candidates points to obtain centerlines.

In another aspect of the present invention, a method of automatically retrieving centerlines of peripheral vessels of a heart in an image is provided. The method includes segmenting the heart in the image to produce a three-dimensional ("3D") segmented myocardium; computing a 3D distance map from the three-dimensional segmented myocardium; modeling a heart wall by a spheroid using the 3D distance map; casting normal maximum intensity projection rays for each voxel on the spheroid; filtering the rays to obtain vessel candidate points; and refining the vessel candidates points to obtain centerlines.

In yet another aspect of the present invention, a machine-readable medium having instructions stored thereon for execution by a processor to perform method of automatically retrieving centerlines of peripheral vessels of a heart in an image is provided. The method includes segmenting the heart in the image to produce a three-dimensional ("3D") segmented myocardium; computing a 3D distance map from the three-dimensional segmented myocardium; casting normal maximum intensity projection rays for each voxel on the surface of the heart in the 3D distance map; filtering the rays to obtain vessel candidate points; and refining the vessel candidates points to obtain centerlines.

In a further aspect of the present invention, a machine-readable medium having instructions stored thereon for execution by a processor to perform method of automatically retrieving centerlines of peripheral vessels of a heart in an image is provided. The method includes segmenting the heart in the image to produce a three-dimensional ("3D") segmented myocardium; computing a 3D distance map from the three-dimensional segmented myocardium; modeling a heart wall by a spheroid using the 3D distance map; casting normal maximum intensity projection rays for each voxel on the spheroid; filtering the rays to obtain vessel candidate points; and refining the vessel candidates points to obtain centerlines.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
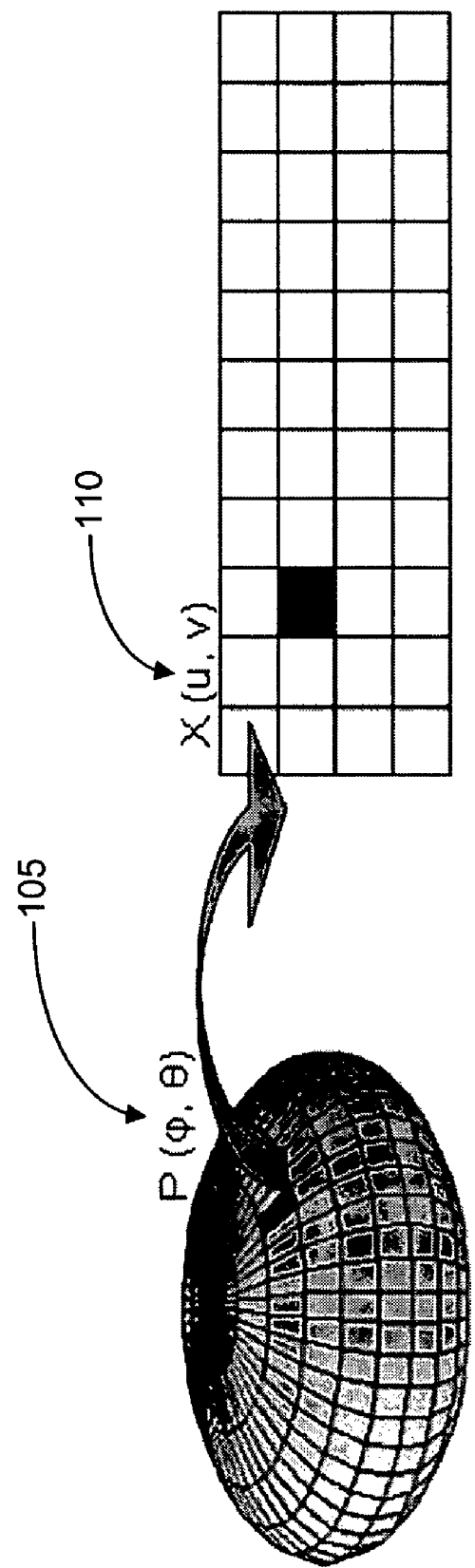
FIG. 1 depicts an exemplary mapping of a point from 3D space to a point in 2D space, in accordance with one exemplary embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

We present a heart peripheral vessels reconstruction method that assumes the existence of a segmented volume representing the heart myocardium. The method is based upon the fact that the vessels are generally parallel to the heart surface. Therefore, segmenting the heart wall may provide important information about the blood vessels. The methods described herein can be used for MR and CT modality images.

We consider a novel, multi-stage approach for automatic coronary vessel segmentation.

(1) The heart is segmented, and the heart wall shell is acquired.

(2) The surface of the heart is modeled by a simple geometrical volume, such as a spheroid.

(3) A ray is cast from each point on the spheroid surface, forming a three-dimensional ("3D") ray collection, and the intersected intensities are recorded. The 3D ray collection is used as a pre-segmentation tool. Each vessel crossed by a ray generates a peak of intensity on the profile curve of the ray. This is a simple technique to detect voxels belonging to vessels. High-intensity tubular structures in this voxel space can then be used to detect the vessels.

(4) A full vessel tree is built, using vessel tracking techniques and minimum spanning tree.

Heart Segmentation and Distance May Computation

We consider a segmentation method driven from a graph optimization technique with a shape constraint. The idea lying behind this graphcut segmentation is to minimize an energy function that is defined on a graph, according to the cut of minimum weight. The energy is written as the sum of two terms: $E_{smooth}(f)$ that imposes smoothness constraints on the segmentation map, and $E_{data}(f)$ measuring how the label f is adapted to the data:

$$E(f) = E_{smooth}(f) + E_{data}(f), \quad (1)$$

$$E_{smooth}(f) = \sum_{p,q \in neighbors} V_{p,q}(f(p), f(q)), \quad (2)$$

$$E_{data}(f) = \sum_{p \in P} D_p(f(p)). \quad (3)$$

$V_{p,q}$ in equation (2) is the interaction function between the pair of neighboring pixels $\{p, q\}$. $D_p$ in equation (3) measures how close the label f is to the pixel p intensity. Generally, such a method provides a global optimal solution for the case of binary valued f(p).

The heart segmentation method provided above is only exemplary. It should be appreciated that other methods for isolating the art may be used, as contemplated by those skilled in the art, such as a model-based segmentation and segmentation methods based on level set methods.

The segmentation described above produces a 3D mask (i.e., pixels labeled object and background). A distance map from the surface of the 3D mask can provide valuable constraints during the recovery of the peripheral vessels. For example, as the peripheral vessels stay parallel to the surface of the heart, their distance (i.e., distance of the vessels from the heart's surface) in the distance map varies smoothly.

The distance map is computed by parsing the 3D mask twice—once in one direction, and once in the other direction. A distance map is basically a volume that associates to each point the distance between this point and a reference (in our case, the heart's surface). Each voxel in the distance map is filtered on an edge (object-background) by a 3D chamfer mask, M, as is commonly known to those skilled in the art. The filtered voxels are used to model the heart by a simpler geometrical object, such as an ellipsoid, to flatten its surface easily using cartography methods, as described in greater detail below.

Modelization of the Shell by a Spheroid

The distance map is used to model the heart wall by an ellipsoid or a biaxial spheroid. Although one may consider a more accurate model such as a tri-axial ellipsoid, a major drawback is that no simple mathematical solution to the 3D-2D projection exists.

The biaxial ellipsoid projection is a well-known technique in cartography, but not in medical imaging of the heart The biaxial spheroid reduces the deformations potentially occurring if using a sphere. For a biaxial ellipsoid of semi-axes length a and b, the surface equation is $$\frac{x^2}{a^2} + \frac{y^2}{a^2} + \frac{x^2}{b^2} = 1 \quad (4)$$

or, in a parametric form: $x = a \cos(\lambda)\sin(\phi)$, $y = a \sin(\lambda)\sin(\phi)$, $z = b \cos(\phi)$ where $\lambda \in [0, 2\pi]$ and $\phi \in [0, \pi]$. Similar to what is commonly used in cartography, $\lambda$ and $\phi$ are called longitude and latitude respectively. The ellipsoid center is computed as the center of gravity. G of all the points located on the distance map isosurface 0 (the heart shell). The large axis Z is the vector $\overrightarrow{GM}$, where M is the point on the isosurface maximizing the length $\|\overrightarrow{GM}\|$. Similarly, the small axis X is the vector $\overrightarrow{GN}$, where N is the point on the isosurface minimizing the length $\|\overrightarrow{GN}\|$. The axis Y is deduced to have a direct orthogonal base, B=(G, X, Y, Z).

It should be noted that the quality of the modeling does not rely on the quality of the segmentation, which makes the method described herein independent from the selection of the segmentation method described above, and robust to noise. Moreover, unlike other organs, the heart naturally has the shape of an ellipsoid. From the ellipsoid surface, rays are cast to compute a two-dimensional ("2D") view of the heart surface.

Ray Casting and N-MIP Projection

Next, we cast rays from the ellipsoid, and collect the voxel intensities in a predefined direction and range inside and outside the heart wall. The distribution of the nodes on the ellipsoid used to cast rays is computed through the following simple transformation. Referring now to FIG. 1, for each point P(λ, φ) 105 in a 3D-space (on an ellipsoid), the 2D-point X(u, v) 110 (on a plane) is computed according to $$[-\pi, \pi][-\pi/2, \pi/2] \mapsto [0, w][0, H],$$

$$(\lambda, \phi) \mapsto \left(u = \frac{W}{2\pi}\lambda, v = \frac{H}{\pi}\phi\right).$$

If rays are cast directly from the distance map itself, the rays would not be homogeneous enough to be exploitable. Indeed, because of the heart surface irregularities, such rays would miss many vessels. Another solution may be based on transverse Mercator projection for a biaxial ellipsoid. The drawback of such a method is that the volume has to be an ellipsoid of revolution, meaning the semi-minor axis is on the polar plane, and the semi-major axes are on the equatorial plane.

Figure 2:
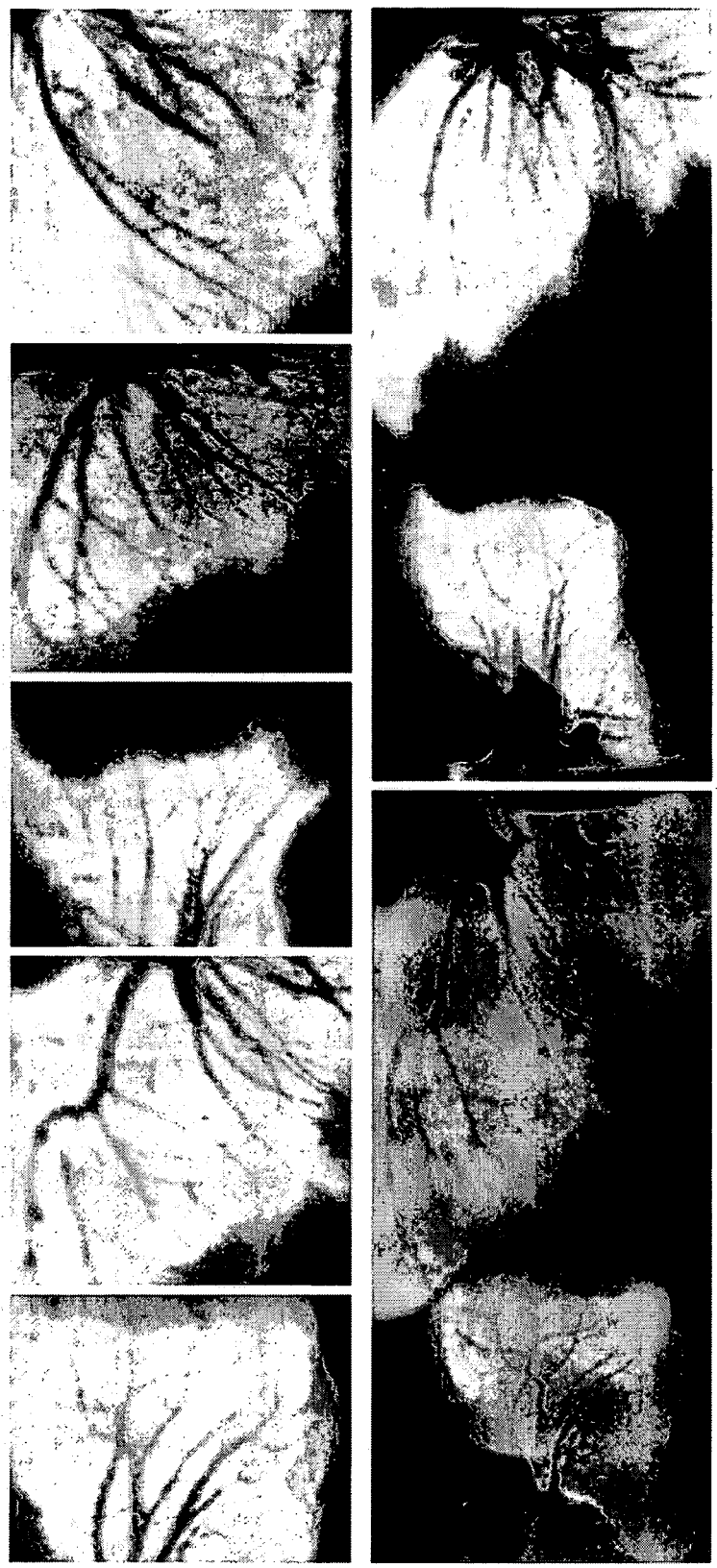
FIG. 2 depicts exemplary unfolded n-MIP views of heart peripheral vessels for various patients, in accordance with one exemplary embodiment of the present invention.

Referring now to FIG. 2, examples of unfolded n-MIP (i.e., normal maximum intensity projection) views of heart peripheral vessels for various patients are shown with inverted colors. As the intensities have been inverted for the views to look like angiograms, the coronary arteries appear darker as compared to the other heart components. Each pixel I(x, y) on the 2D view is the normalized sum of each intensity, $I_n$, of the ray $$I(x, y) = \frac{1}{N}\sum_{0<n<N+1} In \qquad (5)$$

Figure 3:
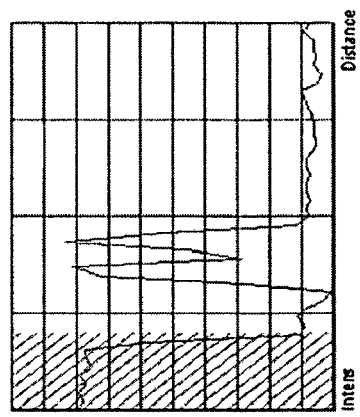
FIG. 3 depicts exemplary profile curves at two different locations on the surface of the heart, in accordance with one embodiment of the present invention.
Figure 3:
Figure 3:
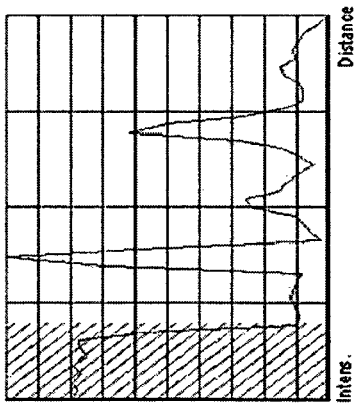
Figure 3:

A profile matching technique is used to detect whether a ray crosses a vessel structure. Referring now to FIG. 3, the ray profile curve starts in the heart wall, which is represented as a large, flat, high intensity area. FIG. 3 shows profile curves at two different locations on the surface of the heart. The myocardium area is indicated by crosshatching. The vascular structures appear as peaks of high intensity, of limited diameter, and at a certain distance from the pericardium.

Next, peaks are processed to determine if they are suitable candidates for a vessel point, according to the following criteria 1. It respects certain intensity properties (intensity value and peak shape)
2. It is within a certain distance from the heart wall The intensity peaks, added to the local maximum (a ridge detection), allow a fair detection of the vessels on the rays profile curve. To detect peaks, we use a zero-crossing of the Laplacian, with the following kernel: [−1 2 −1].

Figure 4:
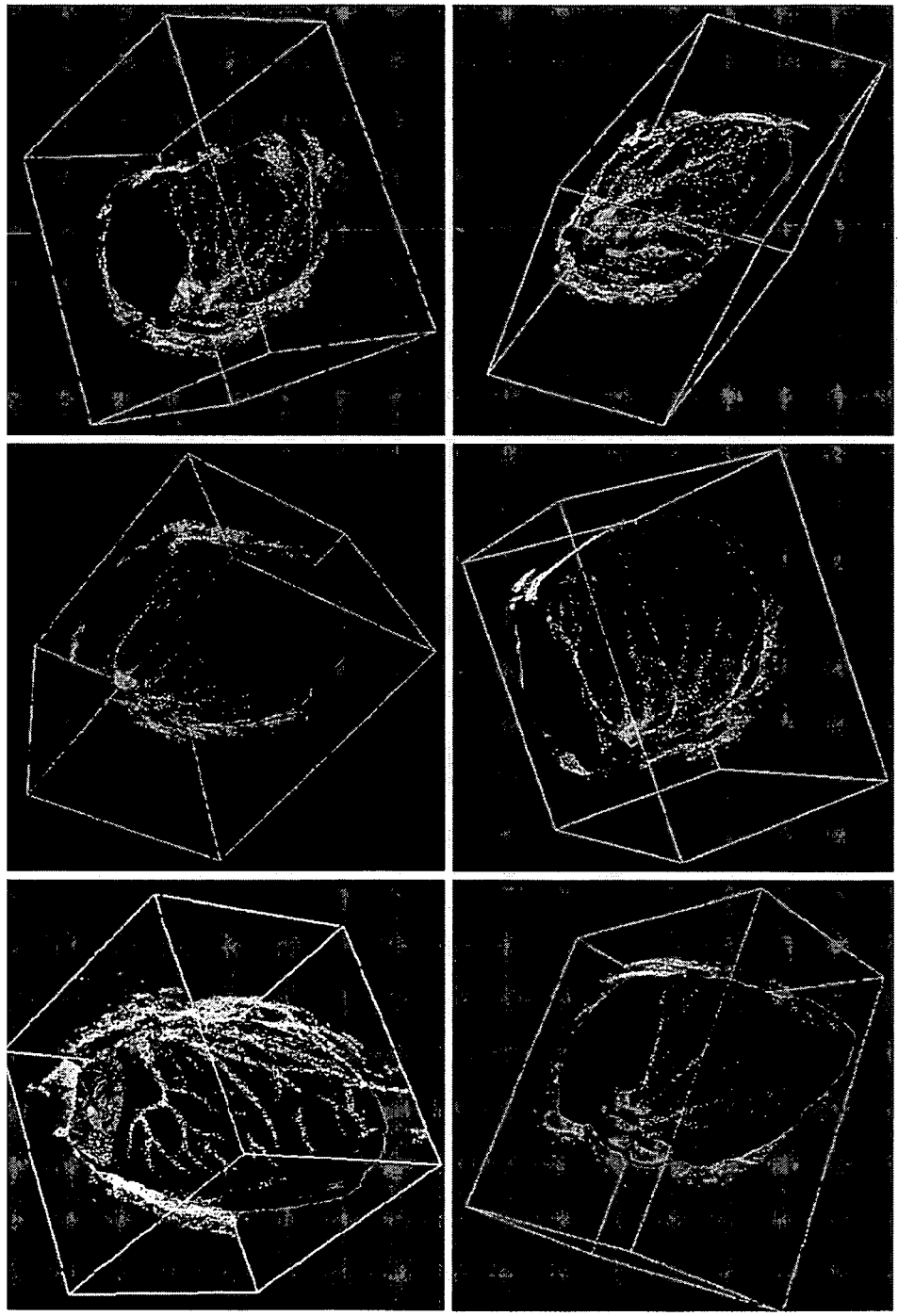
FIG. 4 depicts exemplary vessel candidates, in accordance with one exemplary embodiment of the present invention.

Referring now to FIG. 4, upon completion of such a procedure, the peaks detected on the rays are associated to 3D points. As shown in FIG. 4, these 3D points may not be exactly at the center of the vessels, but they are next to or within the vessel lumen. Such a condition has its origin in the ray-casting effect, as the rays are homogeneously distributed through space. The next step will center these candidate points, filter the noise out, and track the detected vessels.

Refining the Vessel Candidate Points to Find the Centerlines

Vessel candidate voxels can be assumed to be next to or within a vessels lumen. Nevertheless, as shown in FIG. 4, the voxels are not yet on the vessels centerline. Furthermore, also as shown in FIG. 4, the peak detection may be sensitive to noise. Therefore, additional processing is required to center these points and to eliminate the noise. A refinement operation includes an eigenvalues analysis for each 3D-point within its corresponding local intensity space neighbors. With $$A_{ij} = \frac{\partial^2 I}{\partial i \partial j}, \qquad (6)$$

where i and j are equal to x, y or z, and the image intensity function I. At point P in space, the Hessian matrix M is defined as $$M(P)=[A_{ij}]_{[i=x\ldots z, j=x\ldots z]}.$$

As the matrix M is defined, symmetric and positive, the computation of the eigenvalues is straightforward. At the center of the vessels, the three eigenvalues $\lambda_1, \lambda_2$ and $\lambda_3$ verify the following equations There are two principal directions given by the eigenvectors. The vector v1 associated with λ1 corresponds to the local vessel orientation, whereas V2 and v3 define the vessel tangential plane.

For each candidate point P, the intensity function on the tangential cut plane defined by $\overrightarrow{v_2}$ and $\overrightarrow{v_3}$ is filtered by Gaussian functions, $G_\sigma$, with increasing variance σ. The $G_\sigma$ minimizing the $L^2$ norm of $(I-G_\sigma)$ is kept as model. Then, a potential function $V_\sigma$ is built and minimized. $V_\sigma$ represents how well a Gaussian vessel model fits for a variance$_\sigma$ at point P $$A = \frac{|\lambda_2|}{|\lambda_3|}$$

$$B = \frac{|\lambda_2|}{\sqrt{|\lambda_3 \lambda_2|}}$$

$$S = \sqrt{\lambda_1 + \lambda_2 + \lambda_3}$$

$$V_\sigma(p) = (1 - e^{\frac{A^2}{2\alpha^2}})e^{\frac{B^2}{2\beta^2}}(1 - e^{\frac{A^S}{2\gamma^2}}) + \int |G_\sigma - I|^2$$

where α, β and γ are used to control the sensitivity of $V_\sigma$ to the diverse ratio A, B and S. This approach is based on an intensity analysis. Other approaches would include, for instance, taking the mean of the candidate points over a neighborhood. However, noise and high spacing between the points depending on the density of rays make these methods unsuitable for the present application. To account for the high spacing between vessel points, we consider a vessel tracking technique to increase the number of points and link the points together to produce a complete coronary arteries tree.

After the eigenanalysis, we assume we have the points, correctly placed, even though their number is not sufficient to track a vessels centerline. Thus, to place more points, a simple vessel tracking operation is performed for each 3D candidate point, under the conditions of linear intensity variation, consistent distance from the segmented heart wall, and consistent orientation. In other words, from a point resulting from the eigenanalysis, we build another point and link it to the previous one, thus tracking the vessel. The speed vector $\vec{v}_t$ is the weighted sum of two vectors. The speed vector $\vec{v}_{t-1}$ and the local orientation vector $\vec{v}_1$ from the local vessel orientation.

$$\vec{v}_t = \lambda \vec{v}_{t-1} + (1-\lambda) \vec{v}_1$$

where $\lambda \in [0,1]$. This speed vector, as well as intensity and distance of the current candidate point to the heart, has to be homogeneous. We detected edges through a Laplacian analysis:

$$\int |\vec{\nabla} \vec{dl}| <_{coronary} - I_{exterior}.$$

Figure 5:
FIG. 5 depicts exemplary points on the vessels centerline linked together, in accordance with one exemplary embodiment of the present invention.

If such an inequality is not satisfied for the distance function D and the image intensity I, an edge has been detected, and the tracking operation stops. Otherwise, this tracking operation is performed until we reach the end of the vessel, or until we can link all the chains to another point. At this stage, the candidate points are centered and homogeneously distributed on the centerline of the vessel. They are linked by a minimum spanning tree algorithm, minimizing the following cost function E between two points $P_1$ and $P_2$ $$E_{P_1 P_2} = |D(P_1) - D(P_2)|^2 + |I(P_1) - I(P_2)|^2 + \|\overrightarrow{P_1 P_2}\|^2 + |\vec{v}_1(P_1) \square \vec{v}_1(P_2)|,$$

and result in the peripheral vessels centerline, as illustrated in FIG. 5. More specifically, FIG. 5 shows points on the vessels centerline linked together.

Figure 6:
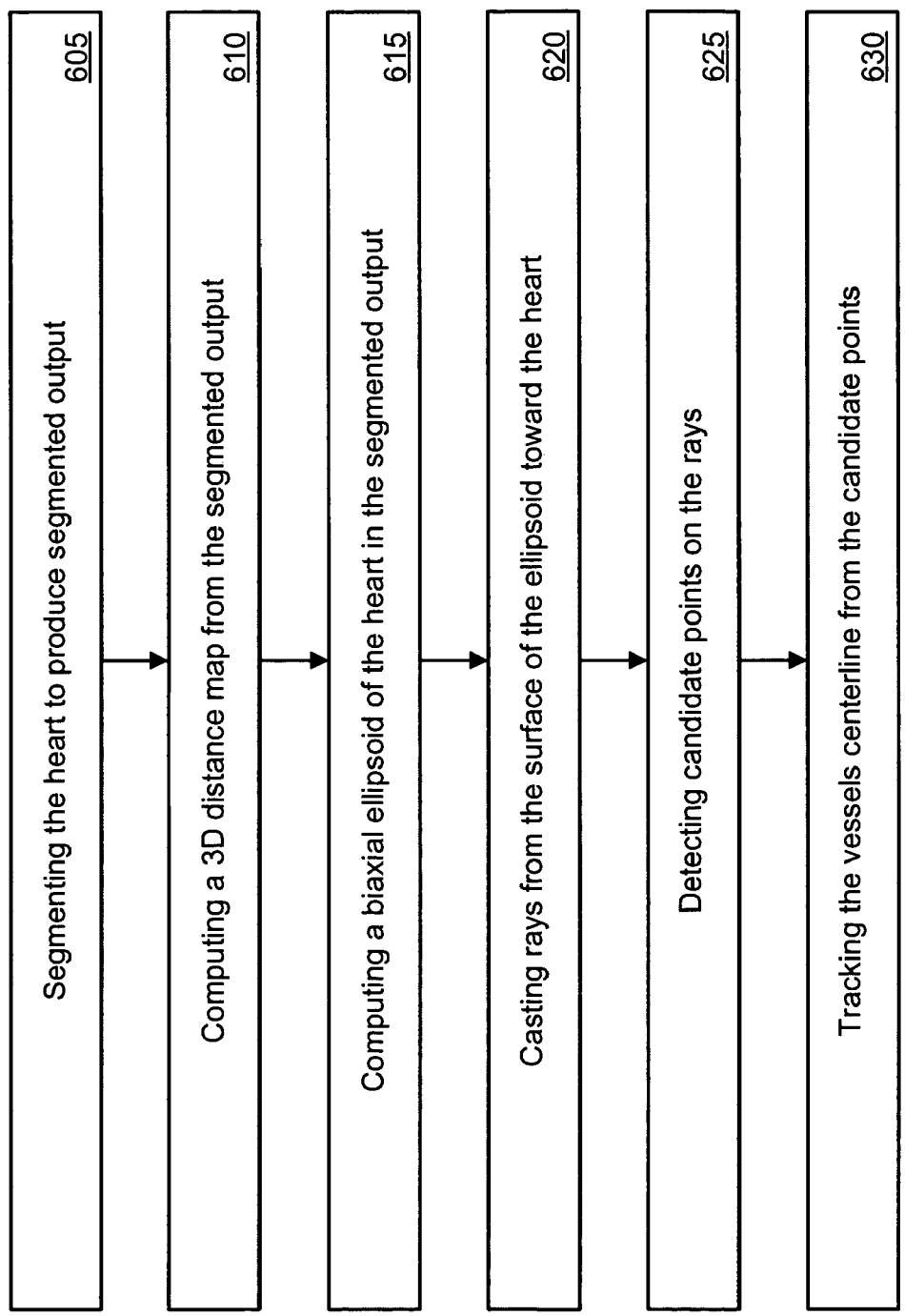
FIG. 6 depicts a flow diagram of a method segmenting heart peripheral vessels, in accordance with one exemplary embodiment of the present invention.

Referring now to FIG. 6, a heart peripheral vessel segmentation method based on a ray filtering method is shown, as described in greater detail above, and in accordance one exemplary embodiment of the present invention. In a step-by-step approach, the heart is first segmented (at 605) using an method based on graph cuts and geodesic surfaces, for example. A 3D distance map is computed (at 610) out of the segmentations output. Then, from this distance map, the biaxial ellipsoid modeling the heart is computed (at 615). Rays are cast (at 620) from the surface of the ellipsoid toward the heart. Then, candidate points likely belonging to vessels are detected (at 625) along the n-MIP rays profiles. Finally, the vessels centerline is tracked (at 630) from the candidate points.

This method can be used, for example, to visualize the full peripheral vessel tree, and detect plaques and aneurysms. Once segmented, the vascular structures can be unfolded, and the quantification of the stenosis and the aneurysms is straightforward. The segmentation results support efficient reporting by enabling automatic generation of overview visualizations, guidance for virtual endoscopy, generation of curved MPRs along the vessels, or cross-sectional area graphs. Moreover, as applied to CT data sets, this method detects vascular structures quickly enough for industrial applications (60 seconds for a bi-processor 900 MHz, 1 GB RAM). Further, this method, as compared to techniques relying on front propagation, is robust to noise.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for analyzing a coronary image, comprising:
   retrieving, automatically, centerlines of peripheral vessels of a heart in the coronary image, wherein retrieving the centerlines comprises,
   segmenting the heart in the coronary image to produce a three-dimensional ("3D") segmented myocardium;
   computing a 3D distance map of distances from a surface of the three-dimensional segmented myocardium to each pixel corresponding to the heart in the coronary image, modeling the heart from the coronary image;
   casting normal maximum intensity projection rays for each voxel on the surface of the heart in the 3D distance map;
   filtering the rays to obtain vessel candidate points; and
   refining the vessel candidates points to obtain the centerlines.

2. The method of claim 1, wherein the step of segmenting the heart comprises segmenting the heart using a graph cut method.

3. The method of claim 1, wherein the step of segmenting the heart comprises segmenting the heart using model-based segmentation.

4. The method of claim 1, wherein the step of segmenting the heart comprises segmenting the heart using level set methods.

5. The method of claim 1, wherein each of the rays is a collection of voxel intensities that are crossed by a straight line.

6. The method of claim 1, wherein the step of filtering the rays to obtain vessel candidate points comprises detecting peaks of high intensity as vessel candidates.

7. The method of claim 6, wherein the step of detecting peaks of high intensity as vessel candidates comprises detecting peaks of high intensity as vessel candidates if the peak is within a predetermined intensity range.

8. The method of claim 6, wherein the step of detecting peaks of high intensity as vessel candidates comprises detecting peaks of high intensity as vessel candidates if the peak is a predetermined distance from the heart wall.

9. The method of claim 6, wherein the step of detecting peaks of high intensity as vessel candidates comprises detecting peaks of high intensity as vessel candidates if the peak is in a predetermined range.

10. The method of claim 9, wherein the step of detecting peaks of high intensity as vessel candidates if the peak is in a predetermined range comprises detecting peaks of high intensity as vessel candidates if the peak is in a predetermined range of 1 mm to 10 mm.

11. The method of claim 6, wherein the step of detecting peaks of high intensity as vessel candidates comprises using a local maximum detection method.

12. The method of claim 1, wherein the step of refining the vessel candidates points to obtain centerlines comprises computing a Hessian matrix and Eigen values for each of the vessel candidate points.

13. The method of claim 1, wherein the image is one of a CT image and MR image.

14. The method of claim 1, further comprising:
linking the centerlines to construct a vessel tree; and
outputting a visualization of the vessel tree.

15. A method for analyzing a coronary image, comprising:
retrieving, automatically, centerlines of peripheral vessels of a heart in the coronary image, wherein retrieving the centerlines comprises,
segmenting the heart in the coronary image to produce a three-dimensional ("3D") segmented myocardium;
computing a 3D distance map of distances from a surface of the three-dimensional segmented myocardium to each pixel corresponding to the heart in the coronary image;
modeling a heart wall by a spheroid using the 3D distance map;
casting normal maximum intensity projection rays for each voxel on the spheroid;
filtering the rays to obtain vessel candidate points; and
refining the vessel candidates points to obtain the centerlines.

16. The method of claim 15, further comprising:
linking the centerlines to construct a vessel tree; and
outputting a visualization of the vessel tree.

17. A machine-readable medium having instructions stored thereon for execution by a processor to perform method for analyzing a coronary image, the method comprising:
retrieving, automatically, centerlines of peripheral vessels of a heart in the coronary image, wherein retrieving the centerlines comprises,
segmenting the heart in the coronary image to produce a three-dimensional ("3D") segmented myocardium;
computing a 3D distance map of distances from a surface of the three-dimensional segmented myocardium to each pixel corresponding to the heart in the coronary image, modeling the heart from the coronary image;
casting normal maximum intensity projection rays for each voxel on the surface of the heart in the 3D distance map;
filtering the rays to obtain vessel candidate points; and
refining the vessel candidates points to obtain the centerlines.

18. The method of claim 17, further comprising:
linking the centerlines to construct a vessel tree; and
outputting a visualization of the vessel tree.

19. A machine-readable medium having instructions stored thereon for execution by a processor to perform method of automatically retrieving centerlines of peripheral vessels of a heart in an image, the method comprising:
retrieving, automatically, centerlines of peripheral vessels of a heart in the coronary image, wherein retrieving the centerlines comprises,
segmenting the heart in the coronary image to produce a three-dimensional ("3D") segmented myocardium;
computing a 3D distance map of distances from a surface of the three-dimensional segmented myocardium to each pixel corresponding to the heart in the coronary image;
modeling a heart wall by a spheroid using the 3D distance map;
casting normal maximum intensity projection rays for each voxel on the spheroid;
filtering the rays to obtain vessel candidate points; and
refining the vessel candidates points to obtain the centerlines.

20. The method of claim 19, further comprising:
linking the centerlines to construct a vessel tree; and
outputting a visualization of the vessel tree.

* * * * *